United States Patent Office 3,585,169
Patented June 15, 1971

3,585,169
FLUOROCARBON ESTERS AND POLYMERS
Elemer Domba, Olympia Fields, Ill., assignor to Nalco Chemical Company, Chicago, Ill.
No Drawing. Continuation-in-part of application Ser. No. 675,352, Oct. 16, 1967. This application Dec. 13, 1968, Ser. No. 783,754
Int. Cl. C08f *3/50, 15/16*
U.S. Cl. 260—78
41 Claims

ABSTRACT OF THE DISCLOSURE

Water- and oil-repellent homopolymers and copolymers are prepared from an acrylyl monomer of the general formula:

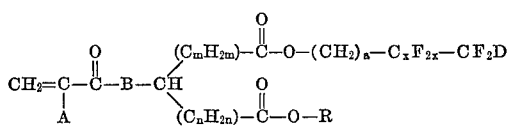

wherein R is selected from the group consisting of hydrogen, water-emulsifiable salt-forming cations, and fluoroalkylradicals of the formula $-(CH_2)_b-(C_yF_{2y})-CF_2E$; and wherein A is hydrogen or lower alkyl ($C_1$ to $C_5$); B is oxygen or NH; D and E are hydrogen or fluorine; $m$ and $n$ are integers from 0 to 4 inclusive, and totalling no more than 4; $x$ and $y$ are integers from 1 to 18 inclusive; and $a$ and $b$ are integers from 1–3 inclusive. The monomer may be copolymerized with fluorine-containing or fluorine-free monomers. When the polymers are applied to fabrics, soil release properties are favored by the half ester (i.e., where R is hydrogen) and its salts, and oil and water repellency are favored by the diesters, where R is a fluoroalkyl radical.

---

This application is a continuation-in-part of copending application Ser. No. 675,352, filed Oct. 16, 1967, now abandoned.

The present invention relates to novel fluorocarbon monomers and polymers, and more particularly to acrylyl fluoroalkyl half esters and diesters and to the water- and oil-repellent polymers prepared therefrom.

In the recent years, there has been great interest in the use of polymeric compounds having fluorocarbon chains for imparting water- and oil-repellent characteristics to fibrous materials such as textiles, paper, leather, and the like. While many of the commercially available compositions impart excellent water-repellent characteristics to such materials, the oil-repellency leaves much to be desired. In addition, such compositions have tended to retain soil that was not repelled, making the treated fabric even more difficult to clean than the untreated fabric. It is therefore an object of the present invention to provide fluorocarbon monomers and polymers having improved oil- as well as water-repellent characteristics to materials, as well as compositions having improved soil release properties.

Generally, the present invention relates to fluorocarbon compounds of the general formula:

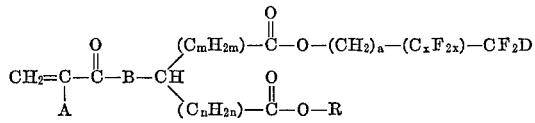

wherein R is selected from the group consisting of hydrogen, water-emulsifiable salt-forming cations, and fluoroalkyl radicals of the formula $-(CH_2)_b-(C_yF_{2y})-CF_2E$, and wherein A is hydrogen or lower alkyl ($C_1$ to $C_5$), B is oxygen or NH, D and E are hydrogen or fluorine $m$ and $n$ are integers from 0 to 4 inclusive, and totalling not more than 4, $x$ and $y$ are integers from 1 to 18 inclusive, and $a$ and $b$ are integers from 1 to 3 inclusive. The term "water-emulsifiable salt-forming cations" refers to those cations which may displace hydrogen to form a water emulsifiable salt. Such a salt should be capable of being readily emulsified in water with the aid of a suitable emulsifying agent, as hereinafter described. Examples of water-emulsifiable salt-forming cations include ammonium, triethylammonium, pyridyl, alkali metals, etc. For convenience, the half esters will be described herein in the acid form, where R is hydrogen. Also within the scope of the present invention are the homopolymers and copolymers prepared from the acrylyl fluoroalkyl esters of the present invention.

The present invention also relates to the treatment of fibrous materials for the purpose of imparting oil and water repellency, which comprises impregnating the fibers with a polymeric composition prepared in accordance with the present invention. The amount of the polymeric composition required depends upon the nature of the material being treated as well as the precise makeup of the composition itself. Generally about 0.1 percent to about 10% and preferably about 0.3% to about 1.0% polymer based on the weight of the treated material, will be required.

In preparing the compounds of the present invention, an amino or hydroxy dicarboxylic acid is esterified with fluoroalcohols characterized by the general formula $$DCF_2-C_xF_{2x}-(CH_2)_aOH$$

wherein $x$ varies from about 1 to about 18, $a$ is an integer from 1 to 3, and D is F or H. Such fluoroalcohols are well known in the art. Where $a$ is one, these alcohols may be referred to as "perfluoro" alcohols. If the half esters are to be prepared, one mole of fluoroalcohols is reacted with each mole of dicarboxylic acid. To prepare the diesters, two moles of fluoroalcohols are reacted with each mole of dicarboxylic acid. Subsequent to the esterification, the fluoroalkyl diester is reacted at the amino or hydroxy group in a manner to introduce an acrylyl, methacrylyl, or other lower alkyl acrylyl group.[1] The compounds thus prepared may be used to form homopolymers and copolymers according to methods well known in the art. The polymers will be characterized by the repeating structure:

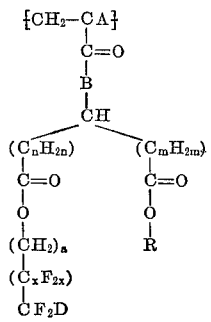

wherein R, A, B, $m$, $n$, $x$, $y$, $a$, and $b$ are as previously defined. As appears from the above general formula, polymers prepared from the diester compositions of the

---

[1] The suffix "yl" has been used herein to designate the carboxyl derivatives. Thus, "acrylyl refers to the structure:

similarly, "acryloxy," is used to refer to the structure:

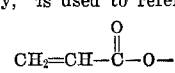

present invention are characterized by adjacent fluoroalkyl groups extending outwardly from the polymer chain. Such adjacent orientation of the fluoroalkyl groups is believed to contribute substantially to the surprisingly high oil-repellency characteristics of the polymers prepared from fluoroalkyl diesters according to the present invention. On the other hand, polymers prepared from the monoester compositions of the present invention have a free carboxylic acid group, which is believed to react with detergent to form a fluorinated soap, which aids in soil release, while still contributing oil and water repellency.

In the case of homopolymers, the above structure will continuously repeat along the polymer chain. However, it is not necessary in order to achieve the advantages of the present invention that the polymers be homopolymers. Even in the case of copolymers, wherein the acrylic fluoroalkyl esters of the present invention are copolymerized with non-fluorocarbon-containing compounds, or with other fluorocarbon monomers, superior oil-repellent and water-repellent characteristics and/or superior soil release properties are achieved.

By controlling the balance between the half ester and diester in the ultimate polymer, it is possible to control the balance between oil and water repellency and soil release, as requirements vary. That is, if oil and water repellency are the only considerations, the diester alone is employed. If increased stain release properties are desired, while loss of some oil and water repellency can be tolerated, the polymerized half ester may be substituted for all or part of the diester.

Hydroxydicarboxylic acids that may be employed in preparing the monomeric compound of the present invention are those having from 1 to 5 carbon atoms in the hydrocarbon chain. Suitable acids include tartronic (hydroxymalonic) acid malic acid, hydroxyglutaric acid, hydroxyadipic acid, and hydroxypimelic acid. Suitable amino acids include aminomalonic acid, aspartic (aminosuccinic) acid, aminoglutaric acid, aminoadipic acid, and aminopimelic acid. Tartronic and malic acids are preferred, since these give the best water- and oil-repellent properties in the polymer. As the hydrocarbon chain in the acid increases, the oil-repellent properties of the product are gradually decreased.

As previously mentioned, the fluoroalcohols used in the present invention are characterized by the general formula:

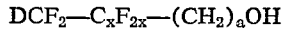

DCF$_2$—C$_x$F$_{2x}$—(CH$_2$)$_a$OH wherein D is hydrogen or fluorine, $x$ is an integer from 1 to 18, and $a$ is an integer from 1 to 3. When the monomers of the present invention are used in the preparation of homopolymers, it is preferred that $x$ be in the range of about 5 to 14, and most preferably in the range of about 5 to 12. On the other hand, when the monomers are used in the preparation of copolymers, wherein the other monomer includes a relatively long fluorocarbon chain, shorter fluorocarbon chains in the present monomers can be employed. In such cases $x$ can range from 1 to 3, although the higher values described above are also satisfactory.

The esterification of the dicarboxylic acid with the fluoroalcohol is accomplished through well-known esterification or transesterification techniques. In the esterification reaction a suitable catalyst such as sulfuric acid is employed, while in the transesterification reaction a catalyst such as sodium methoxide may be used, as will be understood by those skilled in the art.

The acrylyl or alkyl acrylyl radical is added across the amino or hydroxy group by conventional means. Most conveniently, acrylyl chloride is reacted with the diester, preferably in the presence of a conventional polymerization inhibitor such as hydroquinone, or hydroquinone and copper. Alternatively, the acrylyl group may be added by conventional direct or transesterification in the presence of suitable catalysts, as will be understood by those skilled in the art.

As previously stated, the dicarboxylic acid used to make the compounds of the present invention may have an amino or hydroxyl group substituted on the hydrocarbon chain. In the preferred embodiment of the present invention, this group will be a hydroxyl group, and the subsequent polymers impart superior oil and water repellency.

The compositions of the present invention may be used in the preparation of either homopolymers or copolymers. In the formation of copolymers, non-fluorinated or fluorinated monomers may be employed. The preferred non-fluorinated monomers include the polymerizable vinyl compounds such as alkyl acrylates and methacrylates, vinyl esters of aliphatic acids, styrene and alkyl styrenes, vinyl halides, vinylidene halides, allyl esters, vinyl alkyl ketones, certain acrylamides, and 1,3-butadiene and its derivatives. Representative examples include methyl acrylate and methacrylate; hydroxyethyl acrylate and methacrylate; propyl acrylate and methacrylate; butyl acrylate and methacrylate; octyl acrylate and methacrylate; decyl acrylate and methacrylate; pentadecyl acrylate and methacrylate; lauryl acrylate and methacrylate; cetyl acrylate and methacrylate; N,N-diethylaminoethyl methacrylate; acrylic and methacrylic acid; vinyl acetate, vinyl propionate, vinyl acrylate, vinyl laurate, and vinyl stearate; styrene, α-methylstyrene, and p-methyl styrene; vinyl fluoride, vinyl chloride, vinyl bromide, vinylidene fluoride, and vinylidene chloride; allyl heptanoate, allyl acetate, allyl caprylate, and allyl caproate; vinyl methyl ketone, and vinyl ethyl ketone; 1,3-butadiene, α-chloro-1,3-butadiene, 2,3-dichloro-1,3-butadiene, and isoprene; N-methylol acrylamide and N-methylol methacrylamide; isoamyl acrylate and methacrylate; 2-ethylhexyl acrylate and methacrylate. The preferred non-fluorinated monomers are methyl acrylate and methacrylate and hydroxyethyl acrylate and methacrylate. The compositions of the present invention may also be copolymerized with polymer-forming fluoroalkyl and perfluoroalkyl monomers. The preferred monomers of this class are the fluoroalkyl and perfluoroalkyl acrylates, methacrylates, and other lower alkyl acrylates of the general formula:

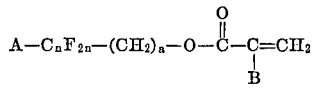

$$A-C_nF_{2n}-(CH_2)_a-O-\overset{O}{\overset{\|}{C}}-\underset{B}{C}=CH_2$$

wherein A is preferably CF$_3$, but may be CF$_2$H, B is hydrogen or lower alkyl, and $a$ is an integer from 1 to 3. The fluorocarbon chain length necessary for effective oil repellency in the polymer depends upon the chain length in the diester compound of the present invention with which it is copolymerized. Generally, $n$ should vary from about 1–18, and will usually be in the range of about 5 to 8. Of course, other fluorocarbon-containing monomers, copolymerizable with the compositions of the present invention, may be employed.

The polymerization reaction is preferably carried out in an aqueous emulsion according to techniques well known in the art. One of the monomers is suspended in aqueous solution, together with a suitable emulsifying agent. A suitable polymerization catalyst is added for initiating the polymerization reaction, and the second monomer is added slowly to the mixture with agitation. Generally, the polymerization reaction is carried out in the range of about 50° to 100° C., although temperature is not critical.

Catalysts for initiating the polymerization of an ethylenically unsaturated compound are well known in the art. Examples of suitable catalysts include: benzoyl peroxide; lauroyl peroxide; tertbutyl perbenzoate; 1-hydroxycyclohexyly hydroperoxide; tert-butyl peroxide; tert-butyl hydroperoxide; 3-carboxypropionyl peroxide; acetyl peroxide; 2,2′ - azodiisobutyramindine dihydrochloride; 2,2′ - azodiisobutyronitrile; 2,2′azobis(2,4 - dimethyl - 4- methoxyvaleronitrile); sodium peroxide; barium peroxide; hydrogen peroxide; ammonium persulfate; potassium persulfate; and the like. The concentration of the catalyst for the polymerization is usually between about 0.02 and 2 percent of the overall weight of the monomers.

Suitable emulsifiers that may be used to stabilize the emulsion during the polymerization step are also well known in the art. Cationic, anionic, or non-ionic emulsifiers may be employed, although the cationic variety is preferred. Representative anionic emulsifying agents are alkyl ($C_{10}$ to $C_{18}$) sodium sulfate, sodium alkyl ($C_{12}$ to $C_{18}$) benzenesulfonate; sodium alkylnaphthalene sulfonate, the sodium salt of sulfated alkenyl ($C_{16}$ to $C_{18}$) acetate, sodium oleate, the sodium salt of sulfated methyl oleate, ammonium ω-H-polyfluoroalkanoate ($C_8$ to $C_{10}$), and ammonium perfluoroalkanoate. The cationic agents that may be employed include dodecyltrimethylammonium acetate; trimethyltetradecylammonium chloride, hexadecyltrimethylammonium bromide, trimethyloctadecylammonium chloride, (dodecylmethylbenzyl) trimethylammonium chloride, benzyldodecyldimethylammonium chloride, N-[2-(diethyl-amino)ethyl] oleamide hydrochloride. Non-ionic surface active agents that may be employed include condensation products of ethylene oxide with hexyl phenol, isooctyl phenol, hexadecanol, oleic acid, alkane ($C_{12}$-$C_{16}$) thiol, alkyl ($C_{12}$-$C_{18}$) amines and the like.

Suitable materials to which the polymers produced in accordance with the present invention may be applied include natural and synthetic fibers, films, yarns, fabrics, and articles made therefrom, as well as paper, leather, and the like. Specific examples include cotton, silk, regenerated cellulose, nylon, fiber-forming linear polyesters, fiber-forming polyacrylonitrile, cellulose nitrate, cellulose acetate, ethyl cellulose, fiberglass, and the like.

The compositions are preferably applied as an aqueous emulsion by any of the many methods well known in the art. Examples of such methods include brushing, dipping, spraying, padding, roll-coating or any combination thereof. After the emulsion has been applied, it is preferably dired and cured in the temperature range from about 200° F. to about 400° F., and most preferably in the range of about 225° to about 350° F. Generally, anywhere from 2 to 30 minutes will be required, although the drying and curing process may usually be accomplished in about 10 minutes, depending upon the temperature. It is often advantageous to first dry the emulsion at a lower temperature (around 220° F.) and then to cure it at a higher temperature. It should be noted that neither time nor temperature is critical, and the above-mentioned ranges should serve only as a guide, they being the usual preferred limits.

The preparation of the compositions of the present invention, together with their use, is illustrated in the following example. These examples are intended as illustrative only, and should not be construed as limitative, the scope of the invention being indicated by the appended claims.

EXAMPLE 1

A reactor fitted with a stirrer and reflux condenser is charged with 100 ml. dioxane. Thirteen grams of malic acid and 40 grams of a commercially available perfluoroalcohol mixture are then dissolved in the dioxane. The perfluoroalcohols have the formula $C_xF_{2x+1}CH_2OH$ wherein $x$ is an integer from 1–3. All three alcohols are present in the mixture in approximately equal proportions. Two ml. of concentrated sulfuric acid are added to catalyze the esterification, and the vessel is closed. The stirrer is started, and the mixture is refluxed for 5 hours. At the end of this period, the dioxane is distilled off, leaving a colorless liquid diester behind.

After removal of the dioxane, the sulfuric acid is neutralized with solid calcium carbonate. The diester is transferred to a second reaction vessel fitted with a stirrer, reflux condenser, and separatory funnel. The separatory funnel is charged with 18 grams acrylyl chloride, 2 grams hydroquinone polymerization inhibitor are added to the diester, and the vessel is closed. The acrylyl chloride is added slowly over a period of ½ hour, and the mixture is refluxed for 6 hours. The reaction product is distilled to remove excess acrylyl chloride which will leave behind a diperfluoroalkyl acrylyloxysuccinate, a colorless, viscous liquid.

EXAMPLE 2

Example 1 is repeated, except that 13 grams of tartronic acid (hydroxymalonic acid) are substituted for the malic acid. The reaction product is a colorless, viscous diperfluoroalkyl acrylyloxymalonate.

EXAMPLE 3

Example 1 is repeated, except that 16 grams of hydroxyadipic acid are substituted for the malic acid. The reaction product is a colorless, viscous diperfluoroalkyl acrylyloxyadipate.

EXAMPLE 4

Example 1 is repeated, except that 16 grams of hydroxyadipic acid are substituted for the malic acid. The reaction product is a colorless, viscous diperfluoroalkyl acrylyloxyadipate.

EXAMPLE 5

Example 1 is repeated, except that 98 grams of a mixture of higher perfluoroalcohols is employed. The perfluoroalcohols are characterized by the formula:

$$C_xF_{2x+1}CH_2OH$$

wherein $x$ is about 5–12 and averages about 8. The diperfluoroalkyl diester product is a colorless fluid, somewhat more viscous than that prepared in Example 1.

EXAMPLE 6

A reactor fitted with a stirrer and reflux condenser is charged with 100 ml. dioxane. Sixteen grams of the methanol ester of aspartic acid (dimethyl aspartate) and 40 grams of the same perfluoroalcohol as employed in Example 1 are then dissolved in the dioxane. One gram of sodium methoxide is added to catalyze the transesterification reaction. The vessel is closed, the stirrer started, and the reaction mixture refluxed for 5 hours. At the end of this time the dioxane and methanol formed during the reaction are distilled off, leaving a colorless fluid diperfluoroalkyl diester of aspartic acid behind.

The diester is transferred to a second reaction vessel fitted with a stirrer, separatory funnel, and reflux condenser. Two grams of hydroquinone polymerization inhibitor are added to the diester, and the vessel is closed. The separatory funnel is charged with 18 grams of acrylyl chloride. The acrylyl chloride is added slowly over a period of ½ hour, while the reaction mixture is refluxed. After 6 hours, refluxing is halted, and the excess acrylyl chloride distilled off. The reaction product is a clear, viscous liquid diperfluoroalkyl acrylamidosuccinate characterized by the formula:

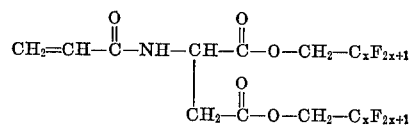

EXAMPLE 7

A reactor fitted with a reflux condenser and a stirrer is charged with about 250 ml. dioxane. One-tenth mole (13.4 grams) of malic acid and one-tenth mole (40 grams) of a higher normal perfluoroalcohol mixture are then dissolved in the dioxane. The perfluoroalcohols are characterized by the formula:

$$C_xF_{2x+1}CH_2OH$$

where $x$ is about 4–11, and averages about 7. One ml. of concentrated sulfuric acid is added to catalyze the esterification, and the vessel is closed. The stirrer is started, and the mixture is refluxed for 5 hours. At the end of this period, the dioxane is distilled off, leaving the liquid half ester behind.

After removal of the dioxane, the sulfuric acid is neutralized with solid sodium carbonate. The product is transferred to a second reaction vessel fitted with a stirrer, reflux condenser, and separatory funnel. The reflux condenser is charged with 18 grams acrylyl chloride, 2 grams hydroquinone polymerization inhibitor are added to the ester, and the vessel is closed. The acrylyl chloride is added slowly over a period of ½ hour, and the mixture is refluxed for 6 hours. The reaction product is distilled to remove excess acrylyl chloride, which leaves behind a monoperfluoroalkyl acrylyloxysuccinate, characterized by the formula:

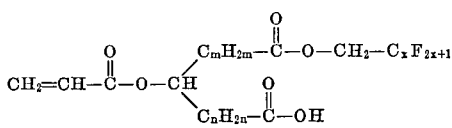

where $m$ and $n$ are 0 or 1 and $m+n=1$, and wherein $x$ is 4–11, and averages about 7.

EXAMPLE 8

A reactor fitted with a reflux condenser and a stirrer is charged with about 250 ml. dioxane. 13.4 grams of malic acid and 200 grams of a higher normal fluoroalcohol mixture are then dissolved in the dioxane. The fluoroalcohols are characterized by the formula:

where $x$ is about 12–18, and averages about 13. One ml. of concentrated sulfuric acid is added to catalyze the esterification, and the vessel is closed. The stirrer is started, and the mixture is refluxed for 5 hours. At the end of this period, the dioxane is distilled off, leaving the liquid diester behind.

After removal of the dioxane, the sulfuric acid is neutralized with solid sodium carbonate. The product is transferred to a second reaction vessel fitted with a stirrer, reflux condenser, and separatory funnel. The reflux condenser is charged with 18 grams acrylyl chloride, 2 grams hydroquinone polymerization inhibitor are added to the ester, and the vessel is closed. The acrylyl chloride is added slowly over a period of ½ hour, and the mixture is refluxed for 6 hours. The reaction product is distilled to remove excess acrylyl chloride, which leaves behind a fluoroalkyl acrylyloxysuccinate, characterized by the formula:

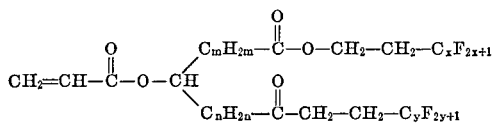

where $m$ and $n$ are 0 or 1 and $m+n=1$, and wherein $x$ and $y$ are 12–18, and average about 13.

The following examples illustrate the use of the esters of the present invention in the preparation of polymers.

EXAMPLE 9

Forty-four grams of acrylyloxysuccinate diester prepared in accordance with Example 1 are placed in a reaction vessel equipped with a stirrer, thermometer, nitrogen inlet and outlet tubes, and two separatory funnels. Two hundred ml. of water containing 4 grams of trimethyltetradecylammonium chloride emulsifying agent are added, and the mixture is agitated to form an emulsion. The reaction vessel is closed and the liquid and space above it are purged of air with a flow of nitrogen. One gram benzoyl peroxide catalyst is dissolved in 5 ml. diethyl ether and placed in one of the separatory funnels.

Fifty-five grams of a commercially available perfluoroacrylate monomer mixture, characterized by the formula:

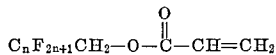

wherein $n$ varies from 4 to 12 and averages about 8, are placed into the other separatory funnel. The catalyst is fed into the reaction vessel, the stirrer is started, and nitrogen is passed through the mixture at a slow rate. The mixture is heated to 70° C., and the perfluoroacrylate in the separatory funnel is added at a slow rate over a period of one hour, during which time the temperature is maintained at 60–80° C., and the stirring continued. Stirring and heating are continued for another hour, and the reaction vessel is opened. The product is a white, milky copolymer latex.

EXAMPLE 10

Example 9 is repeated except that the addition of the perfluoroacrylate monomer mixture is omitted. The product is a white, milky homopolymer latex.

EXAMPLE 11

A monomer similar to that prepared in Example 1 was prepared by esterifying malic acid with a perfluoroalcohol mixture as described in Example 1. The diester product was reacted with butyl acrylate to form the acryloxy diester by transesterification. The butanol formed in the reaction was distilled off, and the diester monomer was copolymerized with a mixture of monomers by the emulsion phase techniques as described in Example 7. The monomer mixture used for the copolymerization is characterized by the general formula

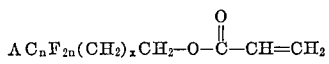

where A is hydrogen or fluorine and $n$ plus $x$ varies from 4 to 12 and averages about 7. About 4% of the mixture is in the perfluoro form, i.e., where $x$ is zero. For the remainder of the mixture, $x$ was 1 or more. The overall fluorine content was about 4% based on the total weight of the mixture.

EXAMPLE 12

Twenty grams of the acrylyloxysuccinic monoester prepared in accordance with Example 7 are placed in a reaction vessel equipped with a stirrer, thermometer, nitrogen inlet and outlet tubes, and a separatory funnel. One hundred ml. of water containing 2 grams trimethyltetradecylammonium chloride emulsifying agent are added, and the mixture is agitated to form an emulsion. The reaction vessel is closed, and the liquid and space above it are purged with nitrogen. One gram of benzoyl peroxide catalyst is dissolved in 5 ml. diethyl ether and placed in the separatory funnel. The catalyst is fed into the reaction vessel, the stirrer is started, and the nitrogen is passed through the mixture at a slow rate. The mixture is heated to about 70° C., and the stirring is continued for 2 hours. The product is a milky polymer latex.

The product prepared in accordance with Example 11 was applied to various fabrics with a roller, dried 5 minutes at 250° F. cured for 5 minutes at 320° F., and tested for water- and oil-repellency. The water-repellency was measured according to a standard test of the American Association of Textile Chemists and Colorists, test method AATCC–22–1961. Basically, the test involves the sprinkling of fabrics held on an embroidery loop at a 45° incline with 1 quart of water at 80° F. from a clothes sprinkler held about 8 inches above the fabric. A rating of 100 indicates no penetration of the water, a rating of 90 shows a slight wetting of the fabric, while a rating of 50 shows slight water repellency and a rating of zero shows complete penetration and wetting.

The oil repellency was measured according to the "3M Oil Repellency Test." This test is described in the April 1962 issue of the Textile Research Journal, at pages 323–

324. Basically, the test involves applying mixtures of light mineral oil and n-heptane to swatches of treated cloth. The failure to absorb a drop of 100 percent heptane in three minutes results in a rating of 150, while failure to absorb a drop of 100 percent mineral oil gives a rating of 50. Absorption of the mineral oil results in a rating of zero. Ratings between 50 and 150 represent various mixtures of mineral oil and n-heptane. Thus, a rating of 110 indicates no penetration by a mixture of 60 percent n-heptane and 40 percent mineral oil. Generally, a rating in the range of 50–70 indicates only a fair resistance to staining, 80–90 indicates good resistance, and 100 or above shows outstanding resistance.

The results are shown in Table 1. Weight percentages are based on the total weight of the fabric plus polymer.

TABLE 1

| Fabric | Weight-percent polymer | Water repellency rating | Oil repellency rating |
|---|---|---|---|
| Cotton | 0.16 | 0–50 | 0 |
|  | 0.32 | 70 | 85 |
|  | 0.48 | 80 | 105 |
|  | 0.96 | 90 | 115 |
| Sateen | 0.06 | 70 | 0 |
|  | 0.13 | 80 | 50 |
|  | 0.26 | 80 | 80 |
|  | 0.40 | 80 | 110 |
|  | 0.65 | 80 | 110 |

As can be observed from Table 1, the polymer prepared in accordance with the present invention exhibits excellent water- and oil-repellency on both cotton and sateen. On cotton, good results were obtained with 0.32% polymer and outstanding results with 0.48% or more. On sateen, only 0.26% polymer was required for good results, while outstanding results are obtained with 0.40% polymer.

The copolymer product of Example 11 was further tested for durability during washing and dry cleaning. The samples were each subjected to three simulated launderings, and the oil and water repellency measured after the first and third washing. Simulated dry cleaning treatments were also performed on the samples, and the repellency measured after three successive treatments.

TABLE 2

| Fabric | Weight-percent polymer | Water repellency ratings | | | |
|---|---|---|---|---|---|
|  |  | Initial | 1 washing | 3 washings | 3 dry cleanings |
| Cotton | 0.96 | 90 | 80 | 80 | 90 |
| Sateen | 0.65 | 80 | 70 | 70 | 90 |
|  |  | Oil repellency ratings | | | |
| Cotton | 0.96 | 115 | 110 | 75 | 130 |
| Sateen | 0.65 | 110 | 110 | 68 | 110 |

As Table 2 demonstrates, the polymer exhibits good washing durability and outstanding dry cleaning durability, the latter resulting in no decrease in oil- or water-repellency.

The product prepared in accordance with Example 12 was applied to various fabrics with a roller, dried 5 minutes at 250° F., cured 5 minutes at 320° F., and tested for oil- and water-repellency, and for soil release. Water repellency was measured according to AATCC Test Method 22–1961, previously described.

To measure oil repellency, droplets of various liquid compositions are carefully applied to the fabric, and each is observed for 30 seconds to determine whether or not it is absorbed. A numerical rating from one to eight is assigned, indicating the highest numbered liquid composition that is repelled. The compositions used and their numerical ratings are given below:

Rating: Composition
1 ................... "Nujol."
2 ................... 65:35 Nujol: n-hexadecane by volume at 70° F.
3 ................... n-Hexadecane.
4 ................... n-Tetradecane.
5 ................... n-Dodecane.
6 ................... n-Decane.
7 ................... n-Octane.
8 ................... n-Heptane.

"Nujol" is a trademark of Plough, Inc., for a mineral oil having a Saybolt viscosity of 360–390 at 100° F., and a specific gravity of 0.880–0.90 at 60° F.

The results are shown in Table 3.

TABLE 3

| Fabric | Weight percent polymer | Oil repellency | | Water repellency | |
|---|---|---|---|---|---|
|  |  | Initial | 1 washing | Initial | 1 washing |
| Spun nylon | 0.33 | 6 | 0 | 0 | 0 |
| Dacron/cotton 65/35 shirting | 0.43 | 6 | 3.5 | 0 | 0 |
| Polyester/cotton perma-press | 0.34 | 6 | 2 | 80–90 | 90 |
| Polyester/cotton 50/50 mercerized | 0.42 | 6 | 4.5 | 50–70 | 70 |
| Dacron 54/cotton shirting, perma-press | 0.34 | 6 | 2.5 | 0 | 0 |
| Cotton print | 0.44 | 6 | 6 | 0 | 0 |

As can be seen from Table 3, the polymer prepared from the half esters of the present invention contributes excellent oil repellency, and, in some cases, water repellency to the fabric samples. While the oil and water repellencies are inferior to those obtained for the previously discussed diesters, they are good, especially in view of the superior soil release properties discussed below.

Soil release ratings were made by spotting identical pieces of fabric, one treated with polymer, and the other untreated. A commercial cooking oil, "Nujol," dirty motor oil, and ink were each used to spot the fabric. Each sample was spotted by placing it on a blotter, dropping 2 drops of each liquid stain on it from a level of 3½ inches, waiting 10 seconds, placing 3″ x 3″ sheet of glassine paper over it, and placing a five-pound weight on top of the paper for one minute. Excess stain was blotted off and the sample was allowed to stand 30 minutes prior to washing.

The samples were washed together in a conventional automatic washer using a commercially available detergent. They were then dried in a conventional home drier. Each spot was then rated on the following scale:

Rating: Appearance of Fabric
5 ................... No visible stain.
4 ................... Stain barely visible.
3 ................... Stain moderately removed.
2 ................... Stain slightly removed.
1 ................... No visible stain removal.

The results are shown in Table 4.

TABLE 4

| Fabric | Weight percent polymer | Stain release after one washing | | | | | | | |
|---|---|---|---|---|---|---|---|---|---|
| | | Nujol | | Cooking oil | | Dirty motor oil | | Ink | |
| | | Treated | Untreated | Treated | Untreated | Treated | Untreated | Treated | Untreated |
| Spun nylon | 0.33 | 5 | 4 | 5 | 4 | 2 | 1 | 2 | 2 |
| Dacron/cotton 65/35 shirting | 0.43 | 5 | 4 | 5 | 4 | 2 | 3 | 3 | 3 |
| Polyester/cotton perma-press | 0.34 | 5 | 5 | 5 | 5 | 1 | 2 | 5 | 3 |
| Polyester/cotton 50/50 mercerized | 0.42 | 5 | 4 | 5 | 5 | 2 | 3 | 2 | 2 |
| Dacron 54/cotton shirting, perma-press | 0.34 | 5 | 5 | 5 | 5 | 2 | 2 | 4 | 5 |
| Cotton | 0.44 | 5 | 4 | 5 | 5 | 3 | 3 | 2 | 2 |

As can be seen from Table 4, the stain release performance of the treated fabric compares favorably with that for the untreated fabric. In some cases, the treated fabric even shows stain release properties that are superior to those for the untreated fabric. This performance contrasts markedly with most oil and water repellent fluorocarbons, which are well known to have generally inferior soil release properties when compared to the untreated fabric.

While the embodiments described herein are at present considered to be preferred, it will be understood that various modifications and improvements may be made therein and it is intended to cover in the appended claims all such modifications and improvements as fall within the true spirit and scope of the invention.

I claim:

1. Acrylyl fluoroalkyl esters characterized by the formula:

$$CH_2=C-\underset{A}{\overset{O}{\overset{\parallel}{C}}}-B-CH\begin{matrix}(C_mH_{2m})-\overset{O}{\overset{\parallel}{C}}-O-(CH_2)_a-(C_xF_{2x})-CF_2D \\ (C_nH_{2n})-\overset{O}{\overset{\parallel}{C}}-O-R \end{matrix}$$

wherein R is selected from the group consisting of hydrogen, water-emulsifiable salt-forming cations, and perfluoroalkyl radicals of the formula:

$$-(CH_2)_b-(C_yF_{2y})-CF_2E$$

and wherein A is selected from the group consisting of hydrogen and lower alkyl; B is selected from the group consisting of oxygen and NH; D and E are selected from the group consisting of hydrogen and fluorine; $m$ and $n$ are integers from 0 to 4 inclusive and totalling no more than 4; $x$ and $y$ are integers from 1 to 18 inclusive; and $a$ and $b$ are integers from 1 to 3 inclusive.

2. The compositions of claim 1 wherein B is oxygen.
3. The compositions of claim 2 wherein $x$ and $y$ are integers from 1 to 3 inclusive.
4. The compositions of claim 2 wherein $a$ and $b$ are 1.
5. The compositions of claim 2 wherein $m$ and $n$ are integers from 0 to 1 inclusive, and totalling no more than 1.
6. The compositions of claim 1 wherein B is NH.
7. Acrylyl fluoroalkyl esters characterized by the formula:

$$CH_2-C-\underset{A}{\overset{O}{\overset{\parallel}{C}}}-B-CH\begin{matrix}(C_mH_{2m})-\overset{O}{\overset{\parallel}{C}}-O-(CH_2)_a-C_xF_{2x}CF_2D \\ (C_nH_{2n})-\overset{O}{\overset{\parallel}{C}}-O-R \end{matrix}$$

wherein R is selected from the group consisting of hydrogen and water-emulsifiable salt-forming cations; A is selected from the group consisting of hydrogen and lower alkyl; B is selected from the group consisting of oxygen and NH; D is selected from the group consisting of hydrogen and fluorine; $m$ and $n$ are integers from 0 to 4 inclusive and totalling no more than 4; $x$ is an integer from 1 to 18 inclusive; and $a$ is an integer from 1 to 3 inclusive.

8. The compositions of claim 7 wherein B is oxygen.
9. The compositions of claim 8 wherein $x$ is an integer from 4 to 11 inclusive.
10. The compositions of claim 9 wherein $m$ and $n$ are integers from 0 to 1 inclusive, and totalling not more than 1.
11. The compositions of claim 7 wherein $a$ is 1.
12. The compositions of claim 7 wherein B is NH.
13. Acrylyl fluoroalkyl diesters characterized by the formula:

$$CH_2=C-\underset{A}{\overset{O}{\overset{\parallel}{C}}}-B-CH\begin{matrix}(C_mH_{2m})-\overset{O}{\overset{\parallel}{C}}-O-(CH_2)_a-(C_xF_{2x})CF_2D \\ (C_nH_{2n})-\overset{O}{\overset{\parallel}{C}}-O-(CH_2)_b-(C_yF_{2y})CF_2E \end{matrix}$$

wherein A is selected from the group consisting of hydrogen and lower alkyl; B is selected from the group consisting of oxygen and NH; D and E are selected from the group consisting of hydrogen and fluorine; $m$ and $n$ are integers from 0 to 4 inclusive, and totalling no more than 4; $x$ and $y$ are integers from 1 to 18 inclusive; and $a$ and $b$ are integers from 1 to 3 inclusive.

14. The compositions of claim 13 wherein B is oxygen.
15. The compositions of claim 14 wherein $x$ and $y$ are integers from 1 to 3 inclusive.
16. The compositions of claim 14 wherein $m$ and $n$ are integers from 0 to 1 inclusive, and totalling not more than 1.
17. The compositions of claim 14 wherein $a$ and $b$ are 1.
18. The compositions of claim 13 wherein B is NH.
19. Copolymers or homopolymers characterized by the repeating structure:

$$\begin{matrix} \{CH_2-CA\} \\ | \\ C=O \\ | \\ B \\ | \\ CH \\ (C_nH_{2n}) \diagup \quad \diagdown (C_mH_{2m}) \\ | \qquad \qquad | \\ C=O \qquad C=O \\ | \qquad \qquad | \\ O \qquad \qquad O \\ | \qquad \qquad | \\ (CH_2)_a \qquad R \\ | \\ (C_xF_{2x}) \\ | \\ CF_2D \end{matrix}$$

wherein R is selected from the group consisting of hydrogen and fluoroalkyl radicals of the formula:

$$-(CH_2)_b-(C_yF_{2y})-CF_2E$$

and wherein A is selected from the group consisting of hydrogen and lower alkyl; B is selected from the group consisting of oxygen and NH; and D and E are selected from the group consisting of hydrogen and fluorine; $m$ and $n$ are integers from 0 to 4 inclusive, and totalling no more than 4; $x$ and $y$ are integers from 1 to 18 inclusive; and $a$ and $b$ are integers from 1 to 3 inclusive, said polymers having the property of imparting oil and water repellency to fibrous materials.

20. The compositions of claim 19 wherein B is oxygen.

21. The compositions of claim 20 wherein $x$ and $y$ are integers from 1 to 3 inclusive.

22. The compositions of claim 20 wherein $m$ and $n$ aree integers from 0 to 1 inclusive, and totalling no more than 1.

23. The compositions of claim 20 wherein $a$ and $b$ are 1.

24. The compositions of claim 19 wherein B is NH.

25. Copolymers or homopolymers characterized by the repeating structure:

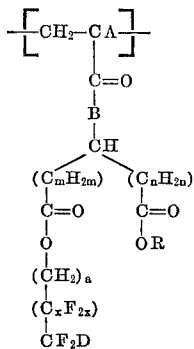

wherein R is selected from the group consisting of hydrogen and water-emulsifiable salt-forming cations; A is selected from the group consisting of hydrogen and lower alkyl; B is selected from the group consisting of oxygen and NH; D is selected from the group consisting of hydrogen and fluorine; $m$ and $n$ are integers from 0 to 4 inclusive and totalling no more than 4; $x$ is an integer from 1 to 18 inclusive; and $a$ is an integer from 1 to 3 inclusive, said polymers having the property of imparting oil and water repellency to fibrous materials.

26. The compositions of claim 25 wherein B is oxygen.

27. The compositions of claim 26 wherein $a$ is 1.

28. The compositions of claim 26 wherein $x$ is an integer from 4 to 11 inclusive.

29. The compositions of claim 28 wherein $m$ and $n$ are integers from 0 to 1 inclusive, and totalling no more than 1.

30. The compositions of claim 25 wherein B is NH.

31. Copolymers or homopolymers characterized by the repeating structure:

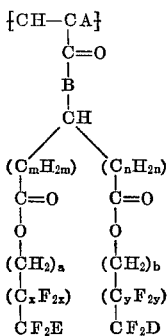

wherein A is selected from the group consisting of hydrogen and lower alkyl; B is selected from the group consisting of oxygen and NH; D and E are selected from the group consisting of hydrogen and fluorine; $m$ and $n$ are integers from 0 to 4 and totalling no more than 4; $x$ and $y$ are integers from 1 to 18 inclusive; and $a$ and $b$ are integers from 1 to 3 inclusive, said polymers having the property of imparting oil and water repellency to fibrous materials.

32. The compositions of claim 31 wherein B is oxygen.

33. The compositions of claim 32 wherein $x$ and $y$ are integers from 1 to 3 inclusive.

34. The compositions of claim 32 wherein $m$ and $n$ are integers from 0 to 1 inclusive, and totalling not more than 1.

35. The compositions of claim 32 wherein $a$ and $b$ are 1.

36. The compositions of claim 31 wherein B is NH.

37. Fibrous materials impregnated with about 0.1% to 10%, by weight, of a copolymer or homopolymer, characterized by the repeating structure:

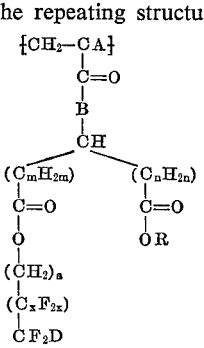

wherein R is selected from the group consisting of hydrogen, water-emulsifiable salt-forming cations, and fluoroalkyl radicals of the formula:

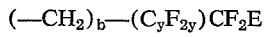

and wherein A is selected from the group consisting of hydrogen and lower alkyl; B is selected from the group consisting of oxygen and NH; D and E are selected from the group consisting of hydrogen and fluorine; $m$ and $n$ are integers from 0 to 4 inclusive, and totalling no more than 4; $x$ and $y$ are integers from 1 to 18 inclusive; and $a$ and $b$ are integers from 1 to 3 inclusive, said fibrous materials having enhanced oil and water repellency.

38. The materials of claim 37 wherein said fibrous material is impregnated with about 0.3% to about 1.0%, by weight, of said polymer.

39. The materials of claim 37 wherein R is selected from the group consisting of hydrogen and water-emulsifiable, salt-forming cations.

40. Thee materials of claim 37 wherein R is a fluoroalkyl radical of the formula:

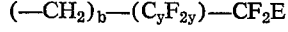

where $a$ is an integer from 1 to 3 inclusive.

41. The materials of claim 40 wherein $b$ is 1.

References Cited
UNITED STATES PATENTS
3,409,602  11/1968  Anello _____ 260—89.5

JOSEPH L. SCHOFER, Primary Examiner

J. KIGHT, III, Assistant Examiner

U.S. Cl. X.R.

117—138.5; 260—78.4, 78.5, 485

PO-1050
(5/69)

UNITED STATES PATENT OFFICE
CERTIFICATE OF CORRECTION

Patent No. 3,585,169      Dated June 15, 1971

Inventor(s) ELEMER DOMBA

It is certified that error appears in the above-identified patent and that said Letters Patent are hereby corrected as shown below:

Column 2, line 66, "acrylyl" should be in quotes.

Column 3, line 36, after "acid", first occurrence, insert a comma.

Column 5, line 3, "cencentration" should be "concentration".

Column 6, line 15, "16" should be "15".

Column 6, lines 15-16, "hydroxyadipic" should be "hydroxyglutaric".

Column 6, line 18, "acrylyloxyadipate" should be "acrylyloxyglutarate".

Column 12, line 35, "ffourine" should be "flourine".

Column 13, line 5, "aree" should be "are".

Column 14, line 50, "Thee" should be "The".

Signed and sealed this 11th day of January 1972.

(SEAL)
Attest:

EDWARD M. FLETCHER, JR.
Attesting Officer

ROBERT GOTTSCHALK
Acting Commissioner of Patents